Jan. 14, 1958   J. W. BABB ET AL   2,819,735
LOOM LET-OFF MECHANISM
Filed June 28, 1956   2 Sheets-Sheet 1

Jan. 14, 1958     J. W. BABB ET AL     2,819,735
LOOM LET-OFF MECHANISM
Filed June 28, 1956     2 Sheets-Sheet 2

INVENTORS:
JASPER W. BABB
and MARSHALL CALVIN VOSS.

BY Eaton, Bell, Hunt + Seltzer

ATTORNEYS

United States Patent Office 2,819,735
Patented Jan. 14, 1958

2,819,735

LOOM LET-OFF MECHANISM

Jasper Wylie Babb and Marshall C. Voss, Asheboro, N. C.

Application June 28, 1956, Serial No. 594,656

10 Claims. (Cl. 139—110)

This invention relates to looms and, more particularly, to an improved let-off mechanism which is extremely sensitive to the requirements of the weaving instrumentalities of the loom.

This invention is particularly concerned with improvements in a type of let-off mechanism such as is disclosed in U. S. Patent No. 2,635,646 issued to Oscar V. Payne on April 21, 1953. This type of let-off mechanism includes a worm gear secured to a warp beam and meshing with a worm carried by a weighted carrier which cooperates with the worm and worm gear to tend to turn the warp beam backwardly for the purpose of tensioning the warp. As the warp is consumed, the carrier turns forwardly with the warp beam until a regularly moving lever or similar element on the loom moves an actuator rack which, through the medium of a ball type or roller type overriding clutch mechanism, effects turning of the worm for the purpose of allowing the weighted carrier to move backwardly with respect to the warp beam.

Overriding clutch mechanisms of the character used heretofore, for transmitting movement from an actuator rack to a worm, included an outer clutch member which was actuated by an actuator rack and an inner clutch member provided with wedge-shaped pockets in its periphery in which force transmitting rollers or balls were positioned.

It has been found that, with extended use of a clutch mechanism of this type, the balls or rollers or the parts engaged thereby became worn to the extent that slippage occurred between the outer and inner clutch members with power transmitting strokes of the actuator rack. Also, such clutch mechanisms are quite complicated and include a substantial number of intricately manufactured parts and it is therefore an object of this invention to overcome such defects by providing an improved ratchet mechanism for transmitting motion from the actuator rack to the worm of a let-off mechanism of the character described for the purpose of allowing the weighted carrier to move backwardly with respect to the warp beam.

It is another more specific object of this invention to provide a let-off mechanism of the character described wherein the worm shaft has a ratchet wheel fixed thereon which is encircled by an annular pawl-carrying member formed integral with or fixed to a pinion whose teeth are engaged by an actuator rack of the type heretofore described. The pawl-carrying member has a plurality of circularly spaced pawls therein which are arranged "out of phase" so that the operating end of at least one of said pawls is always in engagement with the root of one of the teeth in the ratchet wheel whereby, upon a force transmitting stroke being imparted to the actuator rack, motion is immediately transmitted to the worm shaft to effect backward motion of the weighted carrier relative to the warp beam without any lost angular motion between the pawls and the ratchet wheel.

Some of the objects of the invention having been stated, other objects will appear as the description proceeds when taken in connection with the accompanying drawings, in which—

Figure 1:
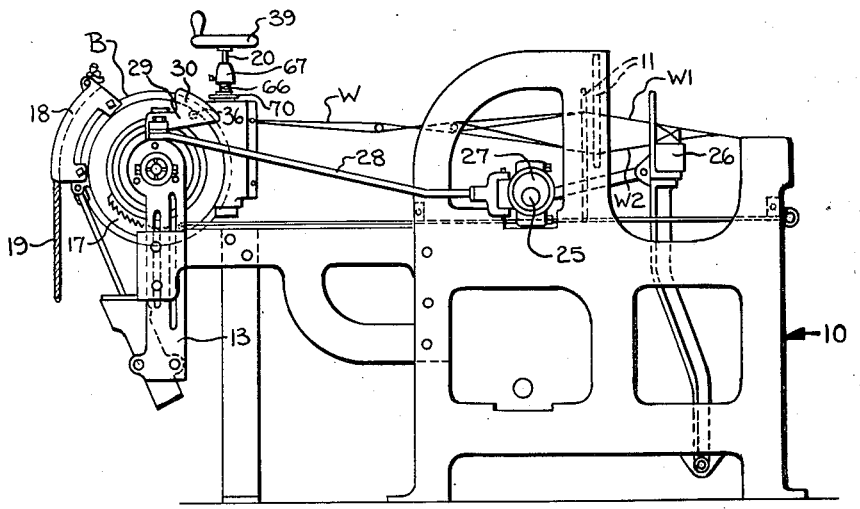
Figure 1 is a somewhat schematic side elevation of a loom with a let-off mechanism mounted thereon embodying the principles of the present invention.

Referring more specifically to the drawings, the numeral 10 generally designates a loom frame (Figure 1) provided with harness frames 11 which form warp sheds W1, W2 in a warp W which is fed forwardly or to the right in Figure 1 from a warp beam B. The warp beam has a shaft 12 mounted for rotation about a horizontal axis in conventional bearings 13, only one of which is shown in Figure 1. A worm gear 15 is concentric with and turns in unison with the beam B. Rotatable about the shaft 12 of the warp beam B is a weighted carrier or housing 17, the rear portion of which is provided with a segment 18 for a rope or cable 19. The lower end of cable 19 has a weight, not shown, attached thereto which tends to move the carrier or housing 17 backwardly or in a counter-clockwise direction in Figures 1 and 2.

The carrier 17 has a shaft 20 journaled therein to which a worm 21, meshing with the worm gear 15, is suitably secured, as by a key 22. The carrier 17 is of hollow construction and has a part 23 which exerts an upward force on a thrust-type ball bearing 24 engaging the lower end of the worm 21. Normally, the warp beam B, the worm 21 and worm gear 15 are locked to the carrier 17 so long as the angular relation of the worm 21 remains constant with respect to the worm gear 15.

The upper end of the shaft 20 in Figure 1 has a hand wheel 39 secured thereto to facilitate manual turning of the worm 21 independently of the actuator 35.

The loom is also provided with a conventional driven crankshaft 25 which drives a lay 26 to cause the same to reciprocate forwardly and rearwardly in the usual manner. The crankshaft has an eccentric 27 thereon to drive an eccentric rod 28, extending rearwardly and connected to a lever 29 pivoted on a stationary part of the loom, such as the bearing 13. The lever 29 is provided with an arm or wing portion 30 which rocks in an horizontal plane and moves substantially parallel to the axis of the warp beam B due to rotation of the crankshaft 25.

An actuator rack 35, provided with a head 36, is slidably mounted in the carrier or housing 17 and the head 36 thereof is adapted to be engaged by the wing 30 when the carrier 17 turns to a position to advance the head 36 within the range of motion of the wing 30. A compression spring 37 fits into the actuator 35 and has one end thereof engaged with the carrier 17 and acts in opposition to the wing 30. When the wing 30 moves toward the warp beam and engages the head 36, the actuator 35 will be given a positive working stroke, derived from the loom, upwardly in Figure 4, and when the wing 30 swings away from the warp beam, the spring 37 will give the actuator a return stroke. One side of the rack 35 is formed with rack teeth 38 which, with reciprocation of the actuator 35, rotate the shaft 20 by means of the improved force transmitting means to be later described.

The improved force transmitting means comprises a ratchet wheel 50 which is loose on the shaft 20 and has a hub 51 integral therewith or suitably secured thereto, the hub 51 preferably being of an external diameter substantially the same as that of the ratchet wheel 50. The lower end of the hub 51 is provided with lugs 52 which fit in corresponding grooves 53 provided in the upper surface of a collar 54 fixed on the shaft 20 as by means of a pin 55 and a key 56. Thus, the collar 54 serves as a primary clutch element and the hub 51 with its lugs 52 thereon serve as a secondary clutch element. It is apparent that, when the lugs 52 are in engagement with the grooves 53 in the collar 54, a fixed connection is provided between the ratchet wheel 50 and the shaft 20.

A shell-like or tubular pawl-carrying member 60 is concentric with the shaft 20 and loosely surrounds the ratchet wheel 50. The lower portion of the tubular pawl-carrying member 60 has a gear or pinion 61 formed integral therewith, or suitably secured thereto, which is adapted to rotate, at times, against the upper surface of an enlarged annular portion 62 on the lower end of the hub 51. The pinion 61 meshes with the actuator rack 35, whereby the pawl-carrying member 60 is oscillated about the axis of shaft 20 incident to loom operation. The teeth of the pinion 61 are of sufficient length to permit the lower end of the hub 51 and its lugs 52 to be raised relative to shaft 20, out of engagement with the collar 54 and the grooves 53 therein, for disconnecting the shaft 20 from the ratchet wheel 50.

Figure 5:
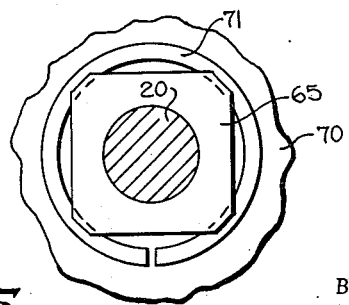
Figure 5 is an enlarged fragmentary plan view taken substantially along line 5—5 in Figure 2.

When the hub 51 is in its raised inoperative position, it is rotatable relative to shaft 20, and the worm 21 can then be turned in the desired position, as in the event of a pickout, independently of the ratchet wheel 50. In order to insure the return of the secondary clutch element into engagement with the primary clutch element 54 and to also facilitate raising the secondary clutch element 51, 52 out of engagement with the primary clutch element 54, the upper end of the ratchet wheel 50 is provided with a reduced portion 65 which is preferably square in plan as best shown in Figure 5. The upper end of portion 65 is engaged by a compression spring 66 which encircles the shaft 20 and whose upper end engages a collar 67 fixed to the shaft 20.

A retainer disk 70 is mounted on the reduced portion 65 of the ratchet wheel 50 and is held thereon by means of a locking or positioning snap-ring 71. The disk 70 is of greater diameter than the pawl-carrying member 60 so as to be engaged by the operator's fingers for lifting the ratchet wheel 50 and associated parts relative to the primary clutch member or collar 54. The tubular pawl-carrying member 60 is retained on the ratchet wheel 50 and hub 51 by the retainer disk 70. However, it is preferable that the retainer disk 70 engages the shoulder, formed at the juncture of the ratchet wheel 50 with its reduced upper portion 65, in order that the pawl-carrying member is free to respond to the action of the spring 37 (Figure 4) as the rack 35 is moved outwardly thereby.

Figure 3:
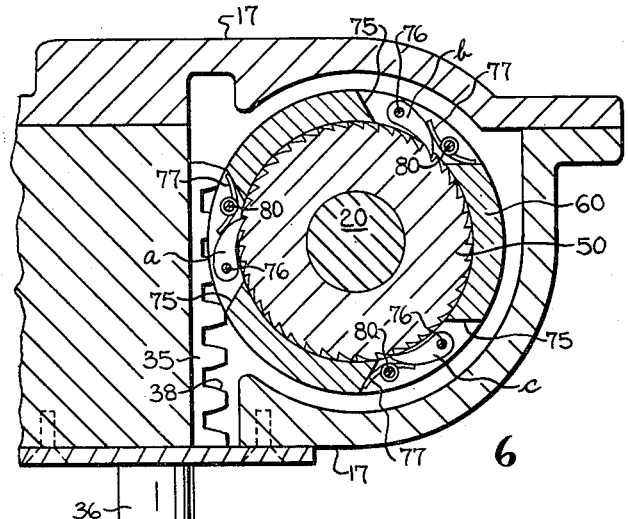
Figure 3 is an enlarged fragmentary sectional plan view taken substantially along line 3—3 in Figure 2.
Figure 4:
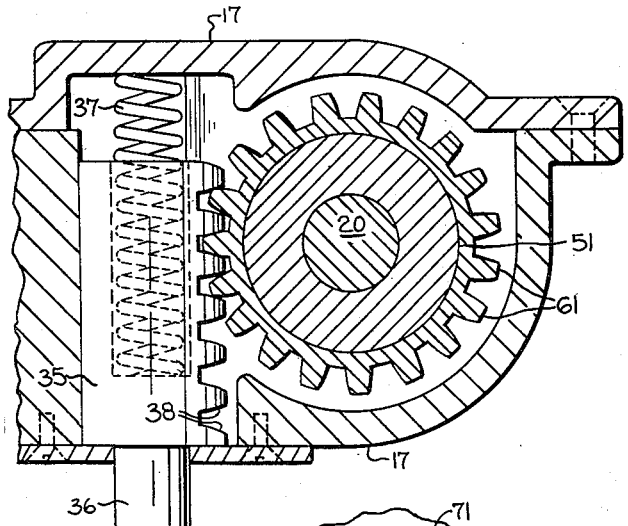
Figure 4 is an enlarged fragmentary sectional plan view taken substantially along line 4—4 in Figure 2.

It is apparent that, each time the head 36 of the actuator rack 35 is engaged and moved by the wing 30 on lever 29, movement is transmitted to the gear 61 and the pawl-carrying element 60 in a clockwise direction and, of course, each time the wing 30 moves outwardly, the spring 37 imparts outward movement to the actuator rack 35 to thereby impart counter-clockwise movement to the gear 61 in Figure 4 and to the pawl-carrying member 60 in Figure 3 in a counter-clockwise direction.

Figure 6:
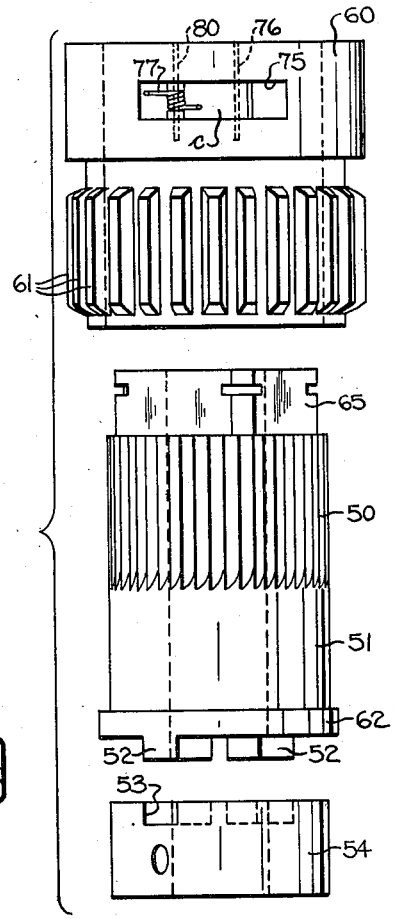
Figure 6 is an exploded view of the most pertinent parts of the improved force transmitting means for the let-off mechanism.

Now, in order to insure that the shaft 20 and its worm 21 respond instantly to each active stroke of the actuator rack 35, the shell-like or tubular pawl-carrying member 60 is provided with a plurality of circularly spaced slots 75 (Figures 3 and 6) in each of which a corresponding ratchet pawl is positioned. In this instance, three such slots 75 are provided and the three pawls are designated at *a*, *b* and *c*, respectively.

Each of the pawls *a*, *b* and *c* is pivotally mounted on a pin 76 fixed in the upper and lower walls of the corresponding slots 75 and the pawls *a*, *b* and *c* are so spaced relative to the teeth in the ratchet wheel 50 that, regardless of the position of the ratchet wheel 50 relative to the pawls *a*, *b* and *c*, one of the pawls is always in engagement with the bottom or root of a corresponding tooth in the ratchet wheel 50. In other words, when the pawl *a* is in engagement with the root of a corresponding tooth as shown in Figure 3, the pawls *b* and *c* are in engagement with the outer surfaces of corresponding teeth in the ratchet wheel 50 but are spaced progressively greater distances from the roots of their corresponding teeth so that, with very slight movement of the pawl-carrying member 60 in a counter-clockwise direction in Figure 3 relative to the ratchet wheel 50, the pawl *c* will drop into the root of a succeeding tooth and, as the pawl-carrying member 60 rotates clockwise to drive the ratchet wheel 50 in Figure 3, the pawl *a* is the only pawl in driving engagement with the corresponding ratchet tooth and the other pawls *b*, *c* are out of driving engagement with the respective ratchet teeth.

Thus, each of the pawls may be termed as being "out of phase" with respect to the other pawls so as to minimize the lost angular motion between the pawl-carrying member 60 and the ratchet wheel 50. It is apparent that the lost angular motion may be further reduced by providing additional phase-spaced pawls.

Each of the pawls *a*, *b* and *c* is resiliently urged into engagement with the teeth in the ratchet wheel 50 by means of a torsion spring 77, a medial portion of which encircles a pin 80 also suitably secured in the upper and lower walls of the corresponding slot 75 and one end of which engages the corresponding ratchet pawl and the other end of which engages one of the end walls of the corresponding slot 75.

It is thus seen that each time clockwise movement of the housing or carrier 17 moves the head 36 of the actuator rack 35 into the path of the wing 30 on the lever 29, active and inactive strokes are imparted to the actuator rack 35 which, in turn, transmit a clockwise rotation to the pawl-carrying member, in a step-by-step manner, by means of the pinion 61. As the pawl-carrying member 60 moves in a clockwise direction in Figure 3, the corresponding pawl *a*, *b* or *c*, as the case may be, then in driving engagement with a ratchet tooth in the wheel 50 will impart a step in rotation to the ratchet wheel 50 which will, in turn, transmit a step in rotation to the shaft 20 and the worm 21.

Figure 2:
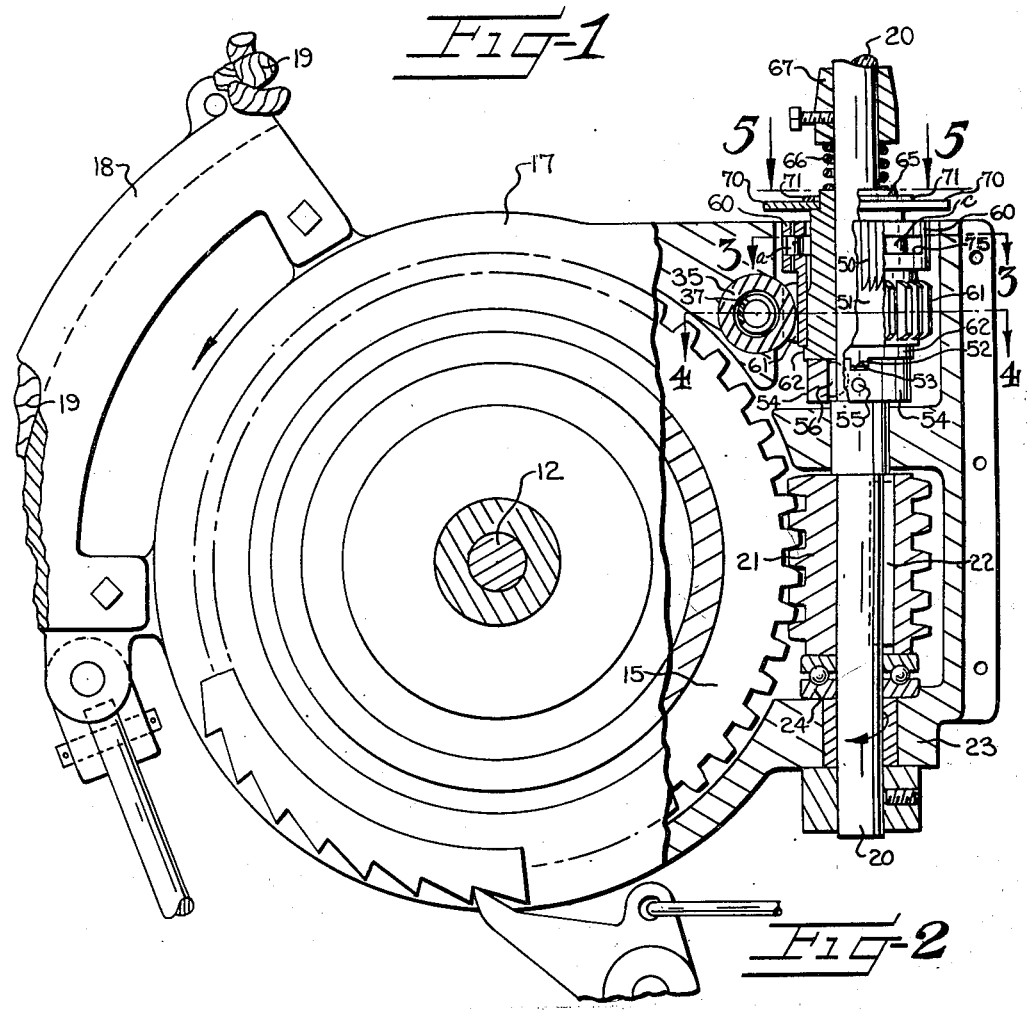
Figure 2 is an enlarged side elevation of the let-off mechanism shown in the upper left-hand portion of Figure 1, with parts broken away to illustrate the improved force transmitting means.

Of course, as the worm 21 is rotated, this causes the housing or weighted carrier 17 to move backwardly or in a counter-clockwise direction in Figure 2, with respect to the warp beam B. The phased relationship of the ratchet pawls *a*, *b*, *c* causes the shaft 20 and worm 21 to respond immediately to each active stroke of the actuator rack 35 so the let-off mechanism will respond to every pick of the loom regardless of whether the loom is weaving a fabric of as few as twenty picks per inch or as many or more than one hundred picks per inch without the necessity of changing the size of the let-off worm 21 and the worm gear 15 and thereby assuring a constant uniform tension in the yarn as it is drawn off the warp beam B by the weaving instrumentalities.

It is thus seen that I have provided an economically and simply constructed, and efficient force transmitting means for a let-off mechanism wherein the wear of relatively movable parts is greatly reduced as compared to prior devices of this character so the improved let-off mechanism can be used for extremely long periods of time without requiring any maintenance whatsoever.

In the drawings and specification there has been set forth a preferred embodiment of the invention and, although specific terms are employed, they are used in a generic and descriptive sense only, and not for purposes of limitation, the scope of the invention being defined in the claims.

We claim:

1. In a let-off mechanism for a loom having a warp beam which rotates forwardly to deliver warp, said let-off mechanism including a worm gear fixed to the warp beam, a weighted carrier concentric with the worm gear mounted to turn relative to the worm gear, a worm mounted for rotation on the carrier and meshing with the worm gear and an actuator which reciprocates transversely of the axis of the worm in response to demand of the loom for warp; the combination of a ratchet wheel coaxial with said worm and having a clutch connection with said worm, a pawl-carrying member encircling said ratchet wheel and having feeding and return angular motion imparted thereto about the axis of the worm by the actuator, a plurality of circularly spaced ratchet pawls carried by said pawl-carrying member and engaging corresponding teeth in said ratchet wheel, and said pawls being each spaced out of phase with respect to the others and with respect to the teeth in the ratchet wheel so that, with each active stroke of said actuator, one of the pawls engages a corresponding tooth in said ratchet wheel to impart movement thereto and whereby the pawl-carrying member need have angular movement relative to the ratchet wheel a substantially lesser amount than the length of any given tooth in the ratchet wheel.

2. In a let-off mechanism for a loom having a warp beam which rotates forwardly to deliver warp, said let-off mechanism including a worm gear fixed to the warp beam, a weighted carrier concentric with the worm gear mounted to turn relative to the worm gear, a worm mounted for rotation on the carrier and meshing with the worm gear and an actuator rack which reciprocates transversely of the axis of the worm in response to demand of the loom for warp; the combination of a ratchet wheel coaxial with said worm and having a clutch connection with said worm, a pawl-carrying member encircling said ratchet wheel, a pinion on said pawl-carrying member and meshing with the actuator rack, a plurality of circularly spaced ratchet pawls carried by said pawl-carrying member and engaging corresponding teeth in said ratchet wheel, and said pawls being each spaced out of phase with respect to the others and with respect to the teeth in the ratchet wheel so that, with each active stroke of said actuator rack, a pawl engages a corresponding tooth in said ratchet wheel to impart movement thereto and to the worm whereby the pawl-carrying member need have angular movement relative to the ratchet wheel a substantially lesser amount than the length of any tooth in the ratchet wheel.

3. In a let-off mechanism for a loom having a warp beam which rotates forwardly to deliver warp, said let-off mechanism including a worm gear fixed to the warp beam, a weighted carrier concentric with the worm gear mounted to turn relative to the worm gear, a worm mounted for rotation on the carrier and meshing with the worm gear and an actuator which reciprocates transversely of the axis of the worm in response to demand of the loom for warp; the combination of a ratchet wheel coaxial with said worm and having a clutch connection with said worm, a pawl-carrying member encircling said ratchet wheel and having feeding and return angular motion imparted thereto about the axis of the worm by the actuator, a plurality of circularly spaced ratchet pawls carried by said pawl-carrying member and engaging corresponding teeth in said ratchet wheel, and said pawls being so arranged that the pawl-carrying member need have angular movement relative to the ratchet wheel a substantially lesser amount than the length of any tooth in the ratchet wheel with each active stroke of said actuator.

4. In a let-off mechanism for a loom having a warp beam which rotates forwardly to deliver warp, said let-off mechanism including a worm gear fixed to move with said warp, a weighted carrier mounted for rotation relative to the worm gear, a worm mounted in said carrier and meshing with said worm gear and an actuator rack mounted in said carrier and reciprocable transversely of the axis of the worm in response to demand of the loom for warp; the combination of a hub member coaxial with said worm and having a clutch connection with said worm, said hub member being provided with ratchet teeth in at least a portion of its periphery, a tubular pawl-carrying member loosely and coaxially mounted on said hub member and being provided with gear teeth in its periphery engageable with the teeth in said rack, a plurality of circularly spaced out of phase ratchet pawls carried by said pawl-carrying member, and means resiliently urging said pawls into engagement with the ratchet teeth whereby said actuator rack reciprocates said pawl-carrying member about the axis of said worm and imparts a step in rotation to the worm with each stroke of the rack in one direction.

5. A structure according to claim 4 wherein a shaft is provided on which said worm is secured and on which said hub member is loosely mounted, said clutch connection comprising a collar fixed on said shaft and engaging one end of said hub member and being provided with at least one groove in one end thereof, and the corresponding end of said hub member being provided with at least one lug thereon engageable with the groove in said collar for normally maintaining a fixed connection between the hub member and the shaft.

6. A structure according to claim 5 having yieldable means normally maintaining the hub member in engagement with said collar.

7. In a let-off mechanism for a loom having a warp beam which rotates forwardly to deliver warp, said let-off mechanism including a worm gear fixed to move with said warp, a weighted carrier mounted for rotation relative to the worm gear, a worm mounted in said carrier and meshing with said worm gear and an actuator rack mounted in said carrier and reciprocable transversely of the axis of the worm in response to demand of the loom for warp; the combination of a hub member coaxial with said worm and having a clutch connection with said worm, said hub member being provided with ratchet teeth in at least a portion of its periphery, a tubular pawl-carrying member loosely and coaxially mounted on said hub member and being provided with gear teeth in its periphery engageable with said rack, a plurality of circularly spaced ratchet pawls carried by said pawl-carrying member, and means resiliently urging said pawls into engagement with the ratchet teeth whereby said actuator rack reciprocates said pawl-carrying member about the axis of said worm and imparts a step in rotation to the worm with each stroke of the rack in one direction.

8. A structure according to claim 7 wherein a shaft is provided on which said worm is secured and on which said hub member is loosely mounted, said clutch connection comprising a collar fixed on said shaft and engaging one end of said hub member and being provided with at least one groove in one end thereof, and the corresponding end of said hub member being provided with at least one lug thereon engageable with the groove in said collar for normally maintaining a fixed connection between the hub member and the shaft.

9. A structure according to claim 8 having yieldable means normally maintaining the hub member in engagement with said collar.

10. In a let-off mechanism for a loom having a warp beam which rotates forwardly to deliver warp, said let-off mechanism including a worm gear fixed to move with said warp, a weighted carrier mounted for rotation relative to the worm gear, a worm mounted in said carrier and meshing with said worm gear and an actuator rack mounted in said carrier and reciprocable transversely of the axis of the worm in response to demand of the loom for warp; the combination of a hub member coaxial with said worm means preventing relative rotational movement between the hub member and said worm; said hub member being provided with ratchet teeth in at least a portion of its periphery, a pawl-carrying member loosely and coaxially mounted on said hub member and being provided with gear teeth in its periphery engageable with the teeth in said rack, at least one ratchet pawl carried by said pawl-carrying member, and means resiliently urging said pawl into engagement with the ratchet teeth whereby said actuator rack reciprocates said pawl-carrying member about the axis of said worm and imparts a step in rotation to the worm with each stroke of the rack in one direction.

References Cited in the file of this patent

UNITED STATES PATENTS

| | | |
|---|---|---|
| 485,330 | Linscott | Nov. 1, 1892 |
| 1,803,143 | Payne | Apr. 28, 1931 |
| 1,976,205 | Wilson | Oct. 9, 1934 |
| 2,419,419 | Payne | Apr. 22, 1947 |
| 2,508,810 | Bergstrom | May 23, 1950 |
| 2,635,646 | Payne | Apr. 21, 1953 |